(12) United States Patent
Osicki et al.

(10) Patent No.: US 9,114,474 B2
(45) Date of Patent: Aug. 25, 2015

(54) ACCESSIBLE WORK CELL

(75) Inventors: David Osicki, Painsville, OH (US); Geoff Lipnevicius, Sagamore Hills, OH (US); Jeff Bennett, San Marcos, CA (US); Nino Silvestro, Independence, OH (US); William Koller, Mentor, OH (US); Thomas Larkins, Chardon, OH (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 689 days.

(21) Appl. No.: 13/083,811

(22) Filed: Apr. 11, 2011

(65) Prior Publication Data

US 2012/0255939 A1    Oct. 11, 2012

(51) Int. Cl.
 *B23K 9/32* (2006.01)
 *B23K 37/00* (2006.01)
 *B23K 37/047* (2006.01)

(52) U.S. Cl.
 CPC ............... *B23K 9/321* (2013.01); *B23K 37/006* (2013.01); *B23K 37/047* (2013.01)

(58) Field of Classification Search
 CPC .... B23K 37/006; B23K 37/047; B23K 9/321; B23K 9/32; E06B 9/0649; E06B 9/0692; E06B 9/70; E06B 9/86; B25J 19/06
 USPC .......... 219/125.1, 121.86, 136; 312/234, 272, 312/309; 901/50; 160/188, 210; 52/36.1, 52/239; 49/404, 409, 410, 411, 425; 454/56, 61, 62
 See application file for complete search history.

(56) References Cited

U.S. PATENT DOCUMENTS

| | | | | |
|---|---|---|---|---|
| 3,017,926 A | * | 1/1962 | Kauppila | ...................... 160/213 |
| 3,547,505 A | | 12/1970 | Ott et al. | |
| 3,714,737 A | | 2/1973 | Fillion et al. | |
| 3,752,056 A | | 8/1973 | Chamberlin et al. | |
| 3,934,496 A | | 1/1976 | Turko | |
| 4,150,606 A | | 4/1979 | Nelson | |
| 4,160,407 A | * | 7/1979 | Duym | ............................. 454/61 |
| 4,377,969 A | | 3/1983 | Nelson | |
| 4,534,281 A | | 8/1985 | Parks et al. | |

(Continued)

FOREIGN PATENT DOCUMENTS

| | | |
|---|---|---|
| CA | 2568515 | 11/2006 |
| CA | 2656193 | 12/2007 |

(Continued)

OTHER PUBLICATIONS

Frommelt Safety Products; Model No. 1380 Verti-Guard Versatile Safety Guard; www.frommeltsafety.com, 2001 (2 pages).

(Continued)

*Primary Examiner* — Dana Ross
*Assistant Examiner* — James Sims, III
(74) *Attorney, Agent, or Firm* — Pearne & Gordon LLP

(57) ABSTRACT

An accessible work cell is provided. In one embodiment, the accessible work cell a plurality of walls defining at least one work zone and at least one pair of sliding doors that provides access to the work zone. The pair of sliding doors includes an upper sliding door and a lower sliding door. The first upper sliding door is operatively connected to the lower sliding door such that movement of the upper sliding door in a first direction will cause the lower sliding door to move in a second direction opposite to the first direction.

14 Claims, 16 Drawing Sheets

(56) References Cited

U.S. PATENT DOCUMENTS

| | | | |
|---|---|---|---|
| 4,659,902 A | 4/1987 | Swensrud et al. | |
| 4,661,680 A | 4/1987 | Swensrud | |
| 4,842,455 A | 6/1989 | Winkler et al. | |
| 4,872,400 A | 10/1989 | Brown et al. | |
| 4,938,548 A | 7/1990 | Richardson | |
| 5,012,537 A | 5/1991 | Underwood | |
| 5,069,197 A | 12/1991 | Wisting | |
| 5,119,870 A | 6/1992 | Rabberman | |
| 5,136,463 A | 8/1992 | Webster | |
| 5,211,159 A * | 5/1993 | Lieblein et al. | 126/299 R |
| 5,229,925 A | 7/1993 | Spencer et al. | |
| 5,265,497 A | 11/1993 | Curless | |
| 5,266,272 A | 11/1993 | Griner et al. | |
| 5,299,770 A | 4/1994 | Sayles | |
| 5,577,817 A | 11/1996 | Reynolds | |
| 5,695,443 A | 12/1997 | Brent et al. | |
| 5,845,692 A * | 12/1998 | Kellem et al. | 160/118 |
| 5,862,920 A | 1/1999 | Leisner | |
| 5,924,920 A * | 7/1999 | DeLuca et al. | 454/62 |
| 6,053,164 A | 4/2000 | Oslin et al. | |
| 6,075,226 A | 6/2000 | Kishbaugh | |
| 6,276,284 B1 | 8/2001 | Remley et al. | |
| 6,282,847 B1 | 9/2001 | Mangelsen et al. | |
| 6,302,779 B1 | 10/2001 | Ryan et al. | |
| 6,394,566 B1 | 5/2002 | Slivon et al. | |
| 6,457,918 B1 | 10/2002 | Green | |
| 6,470,952 B1 | 10/2002 | Cline et al. | |
| 6,568,885 B2 | 5/2003 | Green | |
| 6,571,670 B2 | 6/2003 | Chang | |
| 6,681,532 B1 | 1/2004 | Palmbos et al. | |
| 6,891,128 B1 * | 5/2005 | Sidlinger et al. | 219/137.43 |
| 6,987,241 B2 | 1/2006 | Hacker et al. | |
| 7,097,003 B2 * | 8/2006 | Reynolds et al. | 187/351 |
| 2003/0125821 A1 | 7/2003 | Trotter et al. | |
| 2004/0178182 A1 | 9/2004 | Radtke | |
| 2005/0102061 A1 | 5/2005 | Lent | |
| 2005/0241781 A1 | 11/2005 | Johnson | |
| 2006/0108342 A1 * | 5/2006 | Samodell et al. | 219/125.1 |
| 2006/0267360 A1 | 11/2006 | Kiaie et al. | |
| 2007/0235433 A1 * | 10/2007 | Osicki | 219/125.1 |
| 2008/0046120 A1 | 2/2008 | Mangelsen et al. | |
| 2008/0092449 A1 | 4/2008 | Kadziolka et al. | |
| 2009/0196702 A1 | 8/2009 | Meidar et al. | |
| 2010/0258546 A1 * | 10/2010 | Sithes | 219/136 |
| 2011/0081850 A1 * | 4/2011 | Wright | 454/56 |

FOREIGN PATENT DOCUMENTS

| | | |
|---|---|---|
| DE | 4121205 | 1/1993 |
| DE | 19744624 | 4/1999 |
| EP | 0085636 | 1/1983 |
| EP | 0824043 | 2/1998 |
| GB | 2331482 | 5/1999 |
| GB | 2338018 | 8/1999 |
| GB | 2357311 | 6/2001 |
| JP | 824673 | 1/1996 |
| JP | 2005296780 | 10/2005 |
| JP | 2007151710 | 6/2007 |
| WO | 2007030390 | 3/2007 |

OTHER PUBLICATIONS

Atlas Sound LP; Drawers and Shelves for Enclosure Systems—PCD3-16, PD Series, SA Series, SD Series, SH Series, VTD16, DK19-3; Atlas Sound LP 2001 (2 pages).

Herschal.com/knockoutm.php. Jul. 1, 2007 (1 page).

* cited by examiner

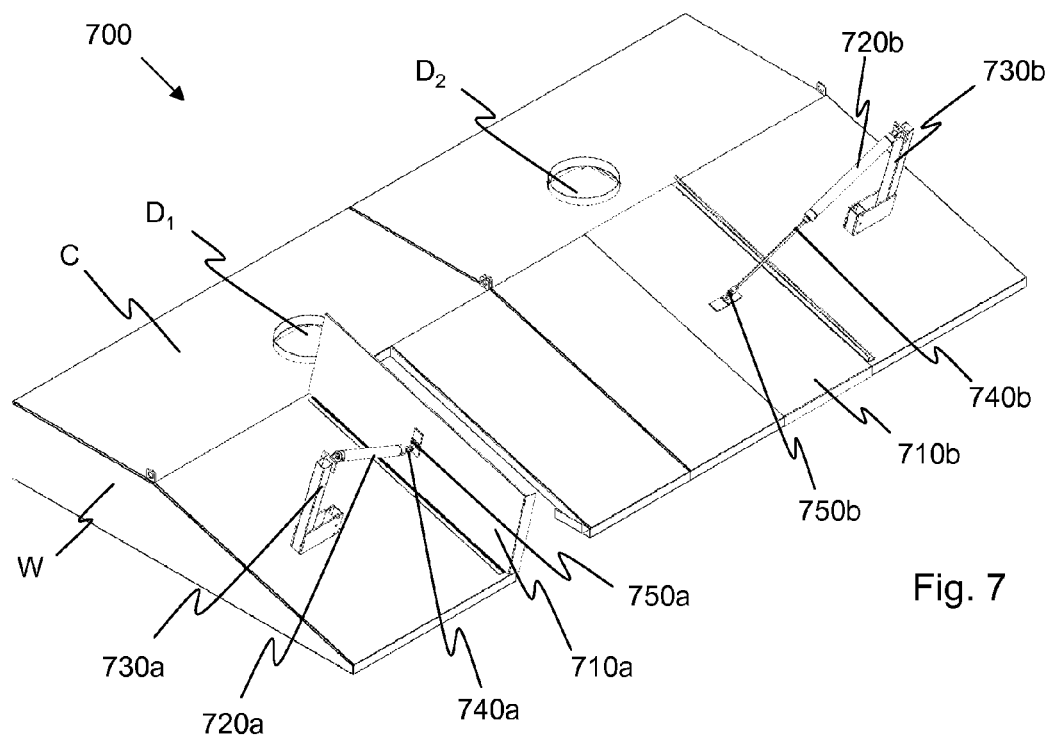
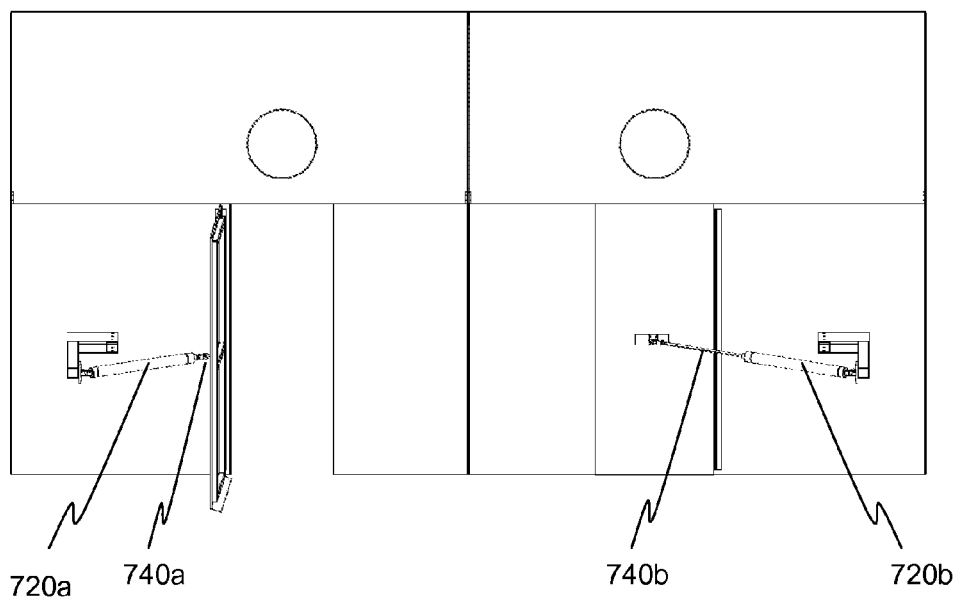

ACCESSIBLE WORK CELL

FIELD OF INVENTION

The present application relates to a work cell. More particularly, the present application relates to an accessible work cell for a welding apparatus.

BACKGROUND

Work cells, or work stations, include a plurality of walls that define one or more work areas. In one known embodiment, the plurality of walls define at least one automated work area. An operator could access the work area through an access point, such as a doorway having a hinged door. Some prior work cells included a fume hood that formed an enclosed work area.

SUMMARY

An accessible work cell is provided. In one embodiment, the accessible work cell a plurality of walls defining at least one work zone and at least one pair of sliding doors that provides access to the work zone. The pair of sliding doors includes an upper sliding door and a lower sliding door. The first upper sliding door is operatively connected to the lower sliding door such that movement of the upper sliding door in a first direction will cause the lower sliding door to move in a second direction opposite to the first direction.

BRIEF DESCRIPTION OF THE DRAWINGS

In the accompanying drawings, structures are illustrated that, together with the detailed description provided below, describe exemplary embodiments of the claimed invention.

In the drawings and description that follow, like elements are identified with the same reference numerals. The drawings are not to scale and the proportion of certain elements may be exaggerated for the purpose of illustration.

FIG. 7 is a perspective view of one embodiment of a fume hood 700 having access doors;

FIG. 8 is top view of the fume hood 800

DETAILED DESCRIPTION

Figure 1:
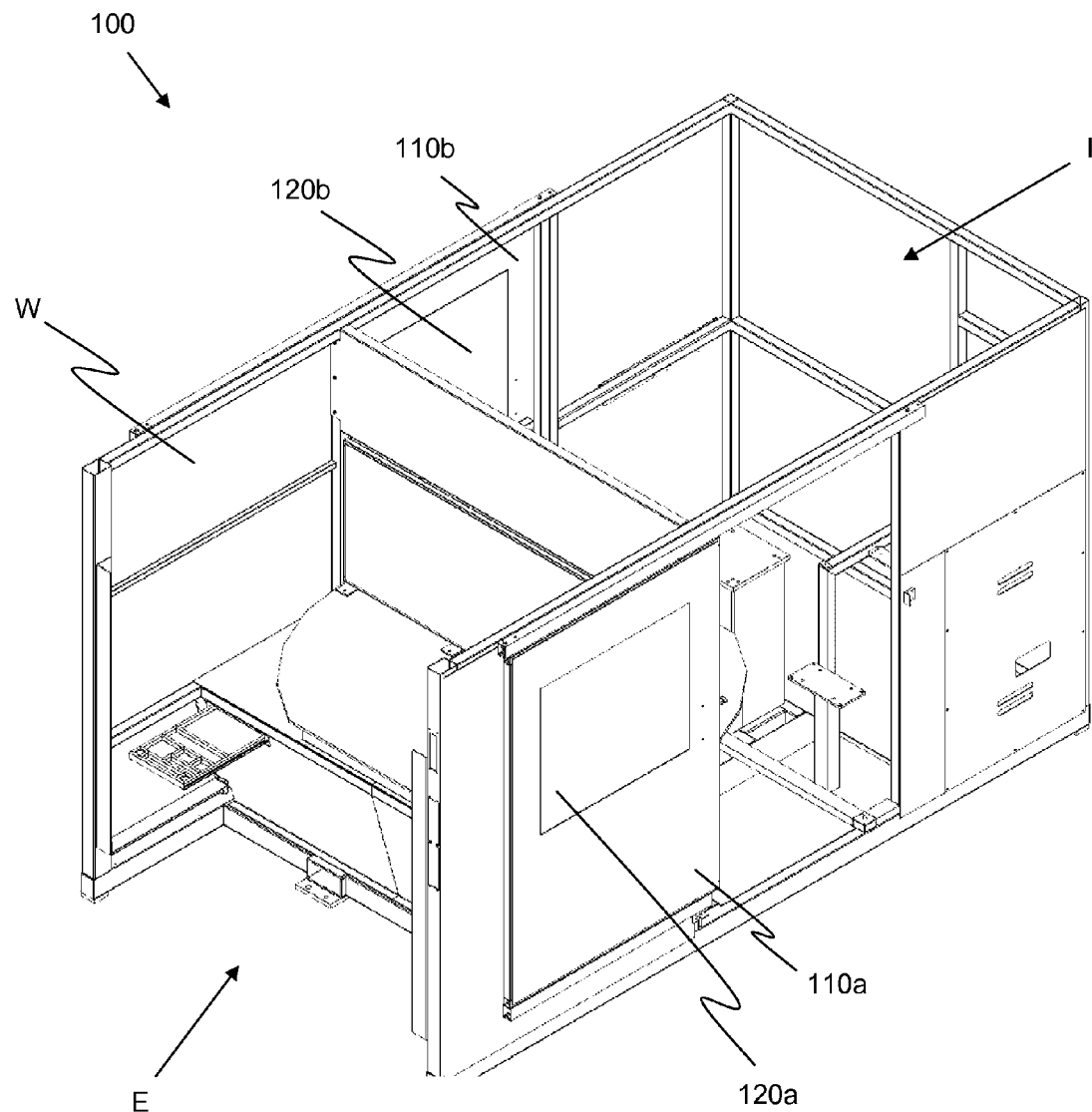
FIG. 1 is a perspective view of one embodiment of a work cell 100 having a sliding door and a sliding drawer.

FIG. 1 illustrates a perspective view of an exemplary work cell 100 with a plurality of walls W. In the illustrated embodiment, the walls W of the work cell 100 define two work areas, including an exterior work area E and an interior work area I. It should be understood, however, that a work cell may include any number of walls and any number of work areas.

In the illustrated embodiment, the work cell 100 is an automated welding station that may also be referred to as a work station. Welding is performed in the interior work area I by a robot, and preparation for welding is performed by an operator in the exterior work area E. The operator may be a human or a robot. The walls W forming the interior work area I may shield the eyes of the operator from an arc created by a welding torch. It should be understood, however, that the work cell 100 is not limited to use in a welding environment. The work cell 100 may be employed for any manufacturing or work environment.

In the illustrated embodiment, the work cell 100 has an open top. In alternative embodiments (not shown), one or more of the work areas may include a ceiling or a fume hood.

With continued reference to FIG. 1, the work cell 100 is accessible through at least a first sliding door 110a on a first side and a second sliding door 110b on an opposite side. The first and second sliding doors 110a,b both slide in substantially horizontal directions. The use of sliding doors on a work cell results in a smaller footprint than outwardly-opening, hinged doors. Although the illustrated embodiment employs two sliding doors, it should be understood that a single sliding door may be employed. Alternatively, three or more sliding doors may be employed.

The first and second sliding doors 110a,b control access to the interior work area I through openings in the walls W. In the illustrated embodiment, the openings are dimensioned to allow an operator to enter the interior work area I. The operator may enter the interior work area I to perform maintenance on a device, such as a robot or welding apparatus, or to insert and remove work pieces from a holder. In alternative embodiments (not shown), the sliding doors may be dimensioned to allow an operator to place a hand or arm into the interior work area I.

In the illustrated embodiment, each of the first and second sliding doors 110a,b includes a window 120a,b. In one embodiment, the window is transparent to allow observers to see inside the interior work area I. In an alternative embodiment, the window is darkened, to allow observers to safely observe a welding operation. In another alternative embodiment, the window is auto-darkening to allow observers to see inside the interior work area when no welding is occurring, and also safely observe a welding operation when an arc is present.

The exterior work area E of the work cell 100 includes a workpiece staging area 130. An operator may prepare a workpiece (not shown) by positioning it in a workpiece holder or a fixture (not shown) in the workpiece staging area 130 while a welding operation is performed in the interior work area I. When the welding operation is complete, the operator may then remove the completed workpiece from the interior work area I and replace it with the prepared workpiece. The workpiece staging area 130 may include a rotary table or an access door to facilitate the removal of a completed workpiece and its replacement with a prepared workpiece.

In the illustrated embodiment, the exterior work area E of the work cell 100 further includes at least one sliding drawer 140. The sliding drawer 140 may include a plurality of partitions configured to house a plurality of different tools or workpieces.

Figure 2:
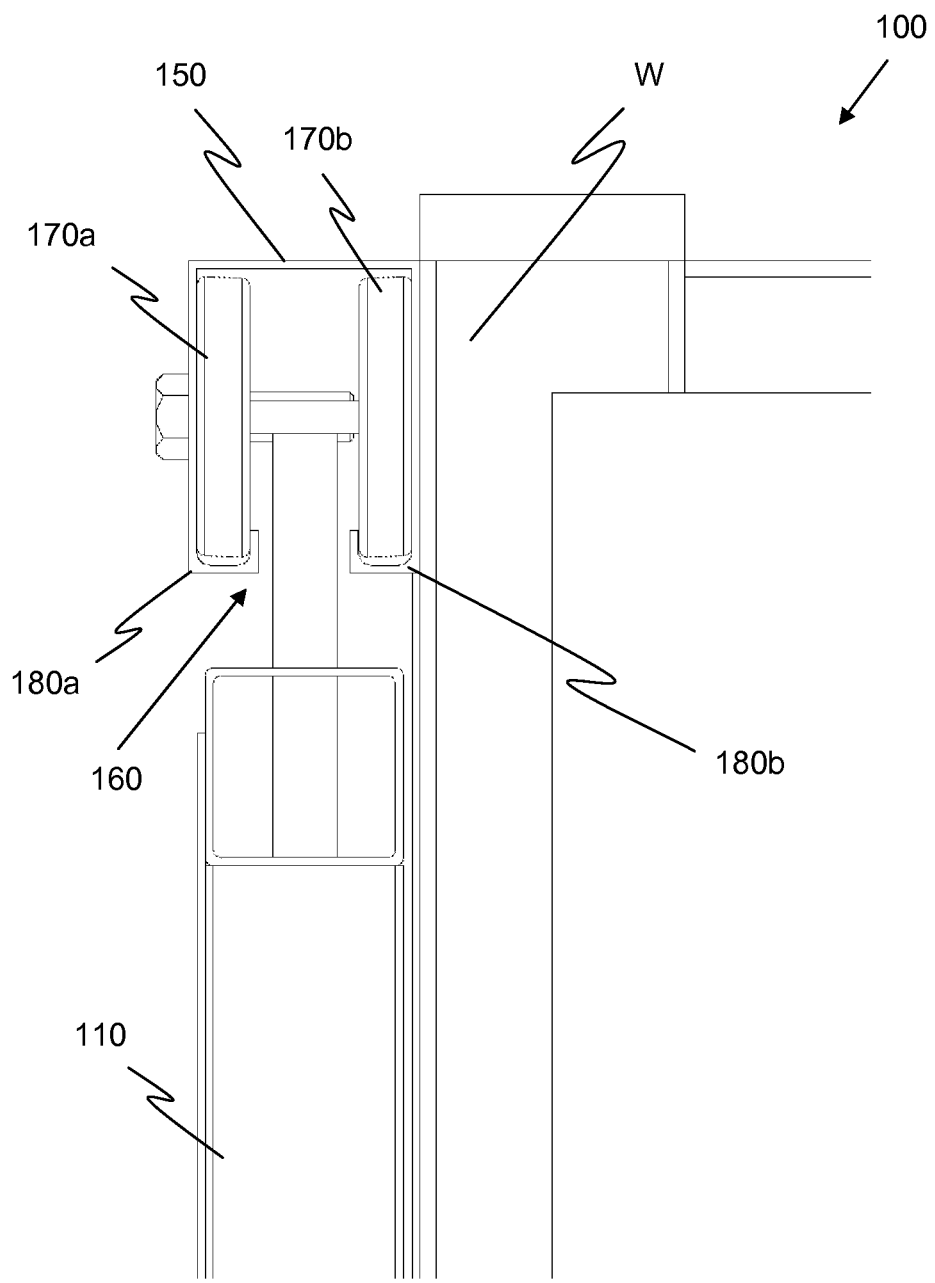
FIG. 2 is a close up, partial side view of a top of a sliding door and a wall of the work cell 100.

FIG. 2 illustrates a close up, partial side view of a top of a sliding door 110 and a wall W of the work cell 100. It should be understood that the door 110 shown in FIG. 2 may be either of the first and second doors 110*a,b* shown in FIG. 1. In the illustrated embodiment, an upper track 150 is operatively connected to an upper portion of a wall W of the work cell 100, and one or more upper rollers 160 are operatively connected to a top of the door 110. The one or more upper rollers 160 includes a first upper wheel 170*a* and a second upper wheel 170*b* configured to engage a first upper rail 180*a* and a second upper rail 180*b*, respectively, of the upper track 150. While FIG. 2 only shows a single roller 160, it should be understood that additional rollers may be disposed along the top of the door 110, in line with the illustrated roller 160, with each configured to engage the first and second upper rail 180*a,b* in the same manner shown.

In an alternative embodiment (not shown), the one or more upper rollers includes a single wheel and is configured to engage a single upper rail. In another alternative embodiment (not shown), the at least one upper roller is operatively attached to an upper portion of the wall and the upper track is operatively connected to the top of the door.

Figure 3:
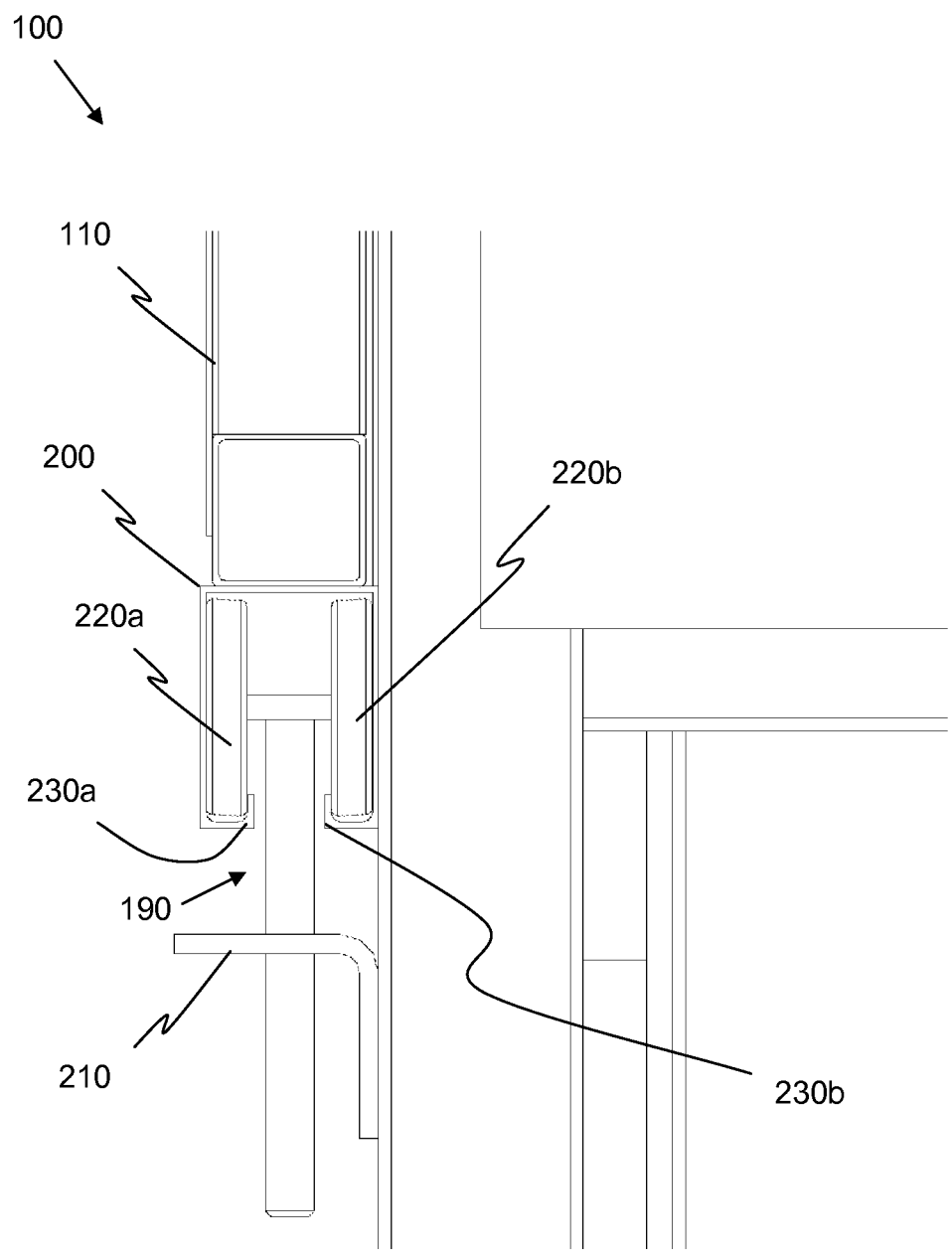
FIG. 3 is a close up, partial side view of a bottom of a sliding door and a wall of the work cell 100.

FIG. 3 illustrates a close up, partial side view of a bottom of the sliding door 110 and the wall W of the work cell 100. In the illustrated embodiment, one or more lower rollers 190 is operatively connected to a lower portion of the wall W of the work cell 100, and a lower track 200 is operatively connected to a bottom of the door 110. In the illustrated embodiment, the one or more lower rollers 190 is connected to the wall W by a bracket 210. In an alternative embodiment (not shown), the one or more lower rollers 190 is directly connected to the wall W.

The one or more lower rollers 190 includes a first lower wheel 220*a* and a second lower wheel 220*b* configured to engage a first lower rail 230*a* and a second upper rail 230*b*, respectively, of the lower track 200. While FIG. 3 only shows a single roller 190, it should be understood that additional rollers may be disposed along the bottom portion of the wall W, in line with the illustrated roller 190, with each lower roller being configured to engage the first lower rail 230*a* and a second lower rail 230*b* of the lower track 200 in the same manner shown.

In an alternative embodiment (not shown), the one or more lower rollers includes a single wheel and is configured to engage a single lower rail. In another alternative embodiment (not shown), the at least one lower roller is operatively attached to the bottom of the door and the lower track is operatively connected to a lower portion of the wall.

Figure 4:
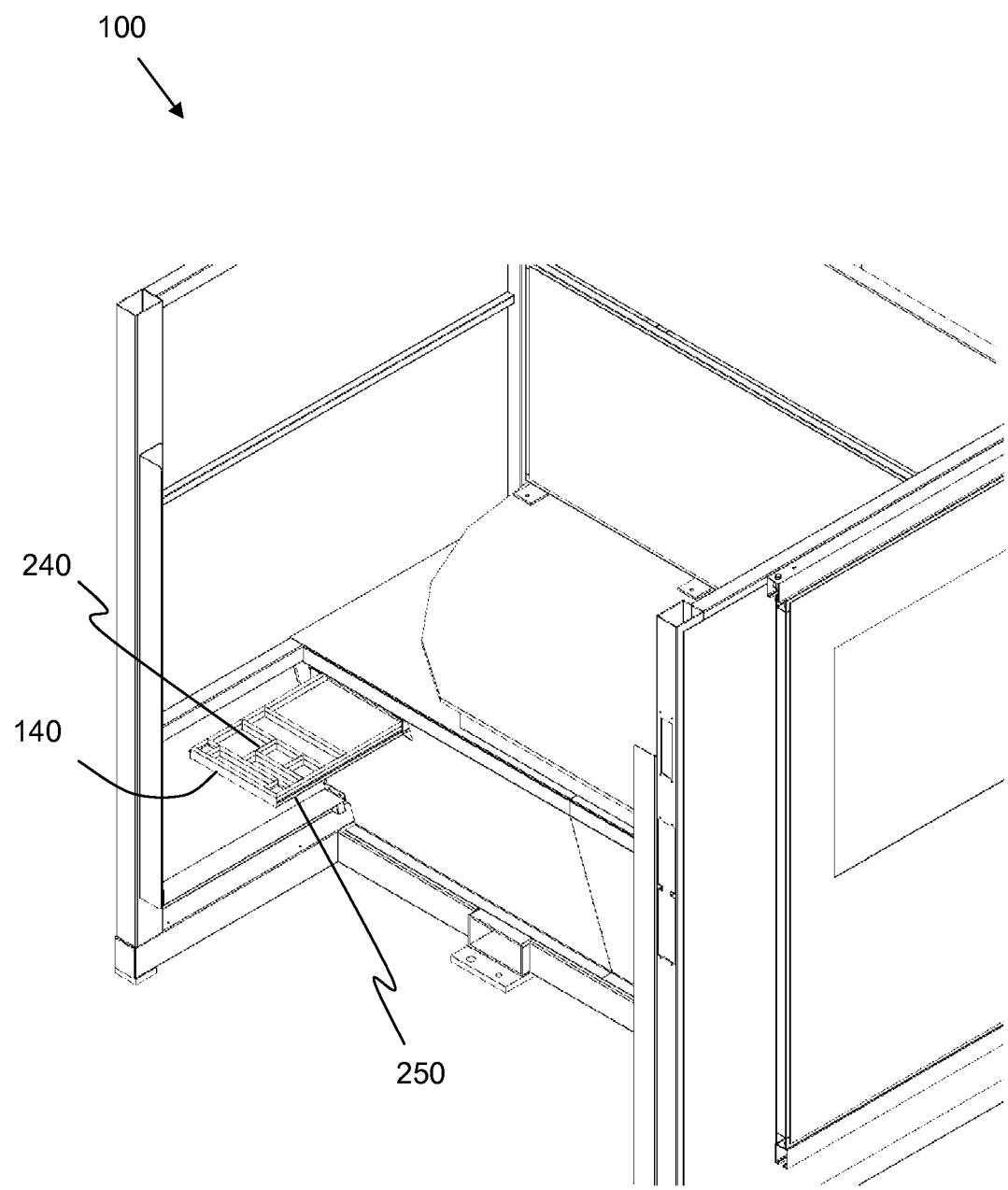
FIG. 4 is a close up, partial perspective view of a sliding drawer of the work cell 100.

FIG. 4 illustrates a close up, partial perspective view of the sliding drawer 140 of the work cell 100. The sliding drawer 140 includes a plurality of partitions 240 that define storage areas of different sizes to accommodate different tools or workpieces. In one embodiment, the partitions are permanently affixed. In an alternative embodiment, the partitions are movable or removable to allow a user to create storage areas of desired sizes.

In the illustrated embodiment, the sliding drawer 140 includes at least one track 250 on each side (only one track is visible in the perspective view of FIG. 4). Each track 250 is configured to engage a corresponding track or one or more rollers (not shown) located inside the work cell. In an alternative embodiment (not shown), the sliding drawer includes one or more rollers on each side, with the rollers configured to engage tracks located inside the work cell.

Figure 5:
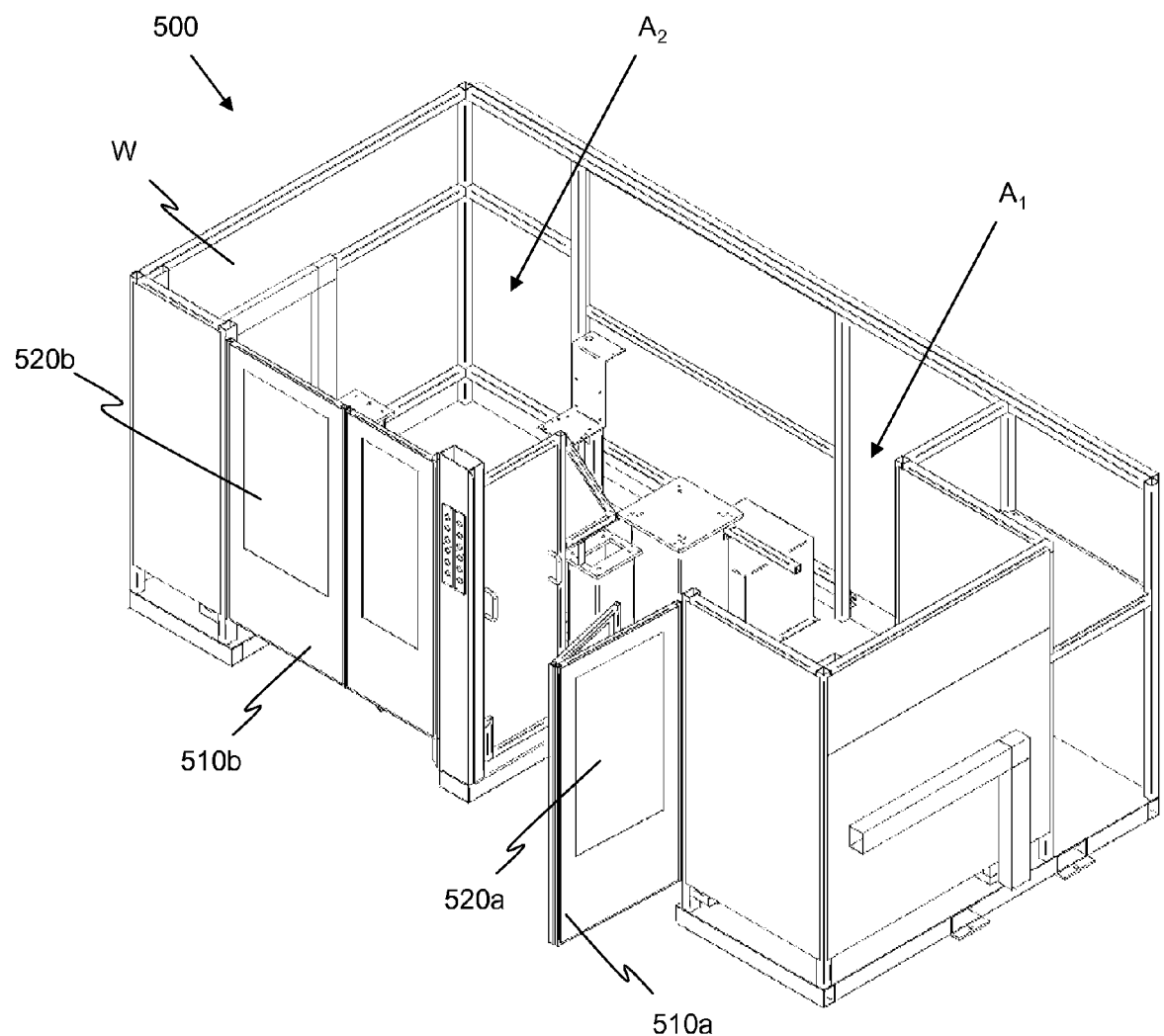
FIG. 5 is a perspective view of another embodiment of a work cell 500 having bi-fold doors.

FIG. 5 illustrates a perspective view of another embodiment of a work cell 500 with a plurality of walls W. In the illustrated embodiment, the walls W of the work cell 500 define two work areas, including a first work area $A_1$ and a second work area $A_2$. It should be understood, however, that a work cell may include any number of walls and any number of work areas.

In the illustrated embodiment, the work cell 500 is an automated welding station that may also be referred to as a work station. In one embodiment, welding is performed in the first and second work areas $A_1,A_2$ by a robot (not shown) located between the two work areas. However, it should be understood that any operation may be performed in the work cell 500.

The walls W forming the first and second work areas $A_1,A_2$ may shield the eyes of the operator from an arc created by a welding torch. It should be understood, however, that the work cell 500 is not limited to use in a welding environment. The work cell 500 may be employed for any manufacturing or work environment.

In the illustrated embodiment, the work cell 500 has an open top. In alternative embodiments (not shown), one or more of the work areas may include a ceiling or a fume hood.

With continued reference to FIG. 5, the work cell 500 includes a first bi-fold door 510*a* on one side of the work cell 500 that provides access to the first work area $A_1$. The work cell 500 further includes a second bi-fold door 510*b* on the same side of the work cell 500 that provides access to the second work area $A_2$. The use of bi-fold doors on a work cell creates a smaller footprint than hinged doors having a single pivot point. The bi-fold doors may also be referred to as compound doors.

In the illustrated embodiment, the first and second bi-fold doors 510*a,b* are dimensioned to allow an operator to enter the first and second work areas $A_1,A_2$, respectively, to perform maintenance on a device, such as a robot or welding apparatus, or to insert and remove workpieces from a holder or fixture. In alternative embodiments (not shown), the bi-fold doors may be dimensioned to allow an operator to insert a hand or arm into the first and second work areas $A_1,A_2$.

Placement of the first and second bi-fold doors 510*a,b* on the same side of the work cell 500 allows an operator to enter the first work area $A_1$, while a robot performs a welding or other operation in the second work area $A_2$. If the work cell 500 is used in this manner, the operator may remove a completed project from the first work area $A_1$, and place workpieces in a holder or fixture in preparation for welding or another operation. The operator may then leave the first work area $A_1$, and when the welding or other operation is completed in the second work area $A_2$, the robot may then begin welding or performing another operation on the prepared workpieces in the first work area $A_1$. The operator may then enter the second work area $A_2$, remove the completed project, and place new workpieces in a holder or fixture.

Although the illustrated embodiment employs two bi-fold doors 510*a,b*, it should be understood that a single bi-fold door may be employed. Alternatively, three or more bi-fold doors may be employed.

In the illustrated embodiment, each of the first and second bi-fold doors 510*a,b* includes a window 520*a,b*. In one embodiment, the window is transparent to allow observers to see inside the area. In an alternative embodiment, the window is darkened, to allow observers to safely observe a welding operation. In another alternative embodiment, the window is auto-darkening to allow observers to see inside the work area when no welding is occurring, and also safely observe a welding operation when an arc is present.

Figure 6:
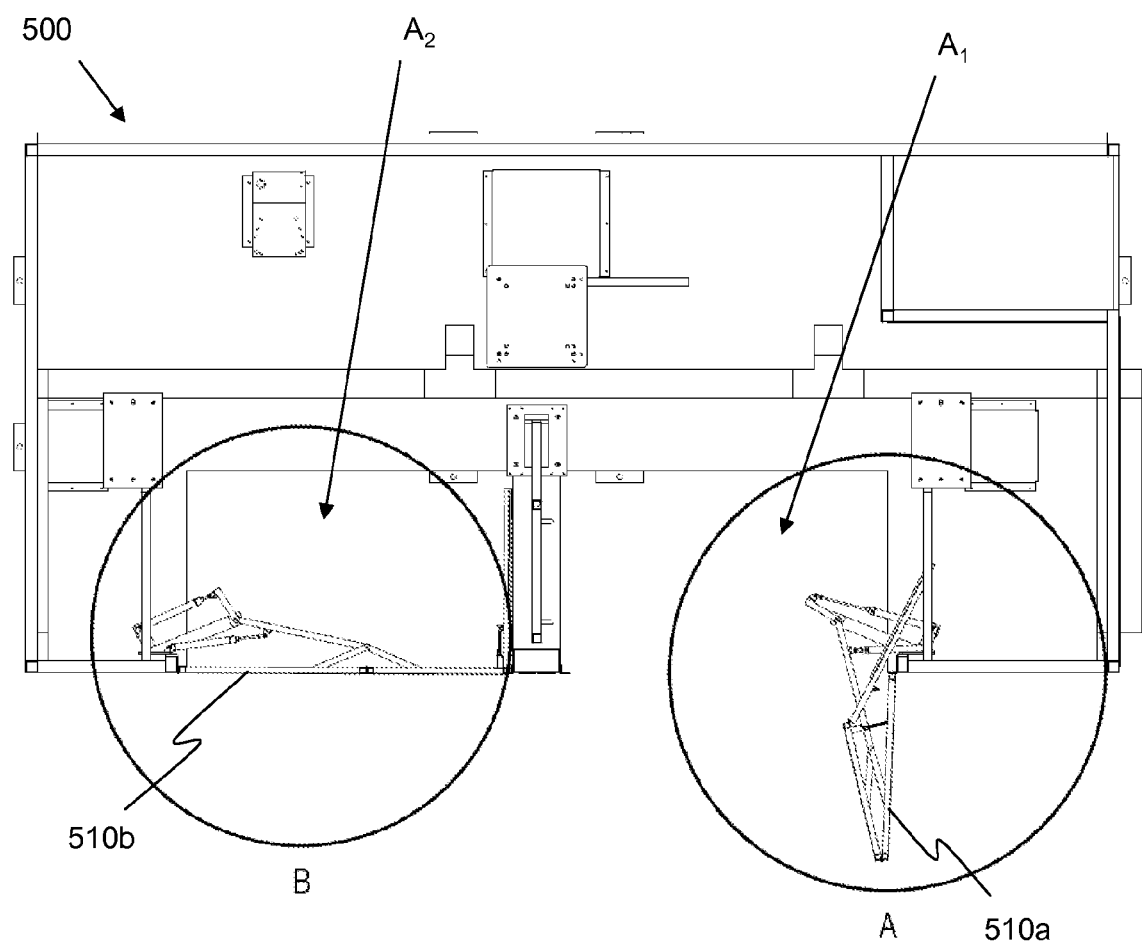
FIG. 6 is a top view of the work cell 500.

FIG. 6 illustrates a top view of the work cell 500, showing the first bi-fold door 510a in an open position and the second bi-fold door 510b in a closed position. Additional detail of the first bi-fold door 510a is shown in the close-up, top view illustrated in FIG. 6A. Similarly, additional detail of the second bi-fold door 510b is shown in the close-up, top view illustrated in FIG. 6B.

Figure 6A:
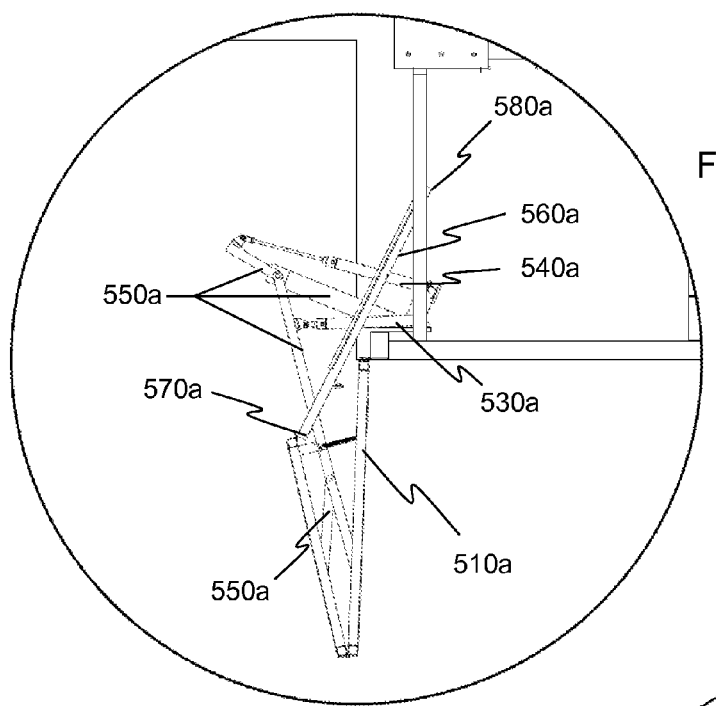
FIG. 6A is a close up, top view of an open bi-fold door of the work cell 500.

In the illustrated embodiment, each of the first and second bi-fold doors 510a,b includes an inner linear actuator 530a,b adjacent the door 510a,b and an outer linear actuator 540a,b spaced from the door 510a,b. The linear actuators may be gas springs, pneumatic cylinders, hydraulic cylinders, ball screw actuators, or other known linear actuators. In the illustrated embodiment, the linear actuators are connected to the bi-fold doors through a plurality of pivoting linking members 550a,b. When the inner linear actuator 530a,b is compressed and the outer linear actuator 540a,b is extended, the bi-fold door 510a,b is in an open position, as shown in FIG. 6A. Additionally, when the inner linear actuator 530a,b is extended and the outer linear actuator 540a,b is compressed, the bi-fold door 510a,b is in a closed position, as shown in FIG. 6B.

The lengths of each of the plurality of pivoting linking members 550a,b may be selected such that each bi-fold door 510a,b moves in a desired manner. While the illustrated embodiment shows four pivoting linking members 550a,b associated with each door 510a,b, it should be understood that any number of pivoting linking members may be employed. In an alternative embodiment (not shown), rotary actuators may be employed to drive the hinges instead of a plurality of linking members.

In one embodiment, the inner linear actuators 530a,b, outer linear actuators 540a,b, and pivoting linking members 550a,b are associated with a control mechanism (not shown) configured to open and close the bi-fold doors 510a,b. The control mechanism may be associated with a computer processor, an automatic timer, or one or more user input mechanisms, such as a button, switch, dial, turnkey, or other known input. In an alternative embodiment, the inner linear actuators 530a,b, outer linear actuators 540a,b, and pivoting linking members 550a,b are configured to assist an operator in manually opening and closing a bi-fold door 510a,b.

Figure 6B:
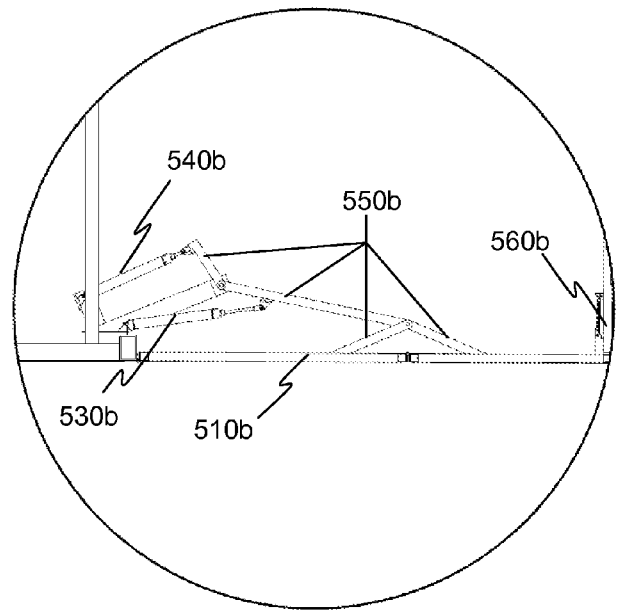
FIG. 6B is a close up, top view of a closed bi-fold door of the work cell 500.

With continued reference to FIGS. 6, 6A, and 6B, each bi-fold door 510a,b further includes a paddle bar 560a,b having a first end 570a,b and a second end 580a,b. In the illustrated embodiment, the first end 570a,b of each paddle bar 560a,b is connected to an end of a bi-fold door 510a,b by a spring loaded hinge 590a,b, and the second end 580a,b is a free end that sweeps through the work area $A_1, A_2$ when the bi-fold door 510a,b opens or closes. In an alternative embodiment (not shown) the first end 570a,b of the paddle bar 560a,b is rigidly connected to the bi-fold door 510a,b. In another alternative embodiments (not shown), the first end 570a,b of the paddle bar 560a,b may be connected to a linking member or to a location spaced from the end on the bi-fold door 510a,b.

In one embodiment, the second end 580a,b includes a mating device (not shown) configured to engage a switch (not shown) in the work cell 500 when the bi-fold door 510a,b is in the fully closed position. Alternatively, the second end 580a,b may include a switch configured to engage a mating device in the work cell 500 when the bi-fold door 510a,b is in the fully closed position. The robot may be configured to remain in an idle mode until the mating device engages the switch. In this manner, the paddle bar 560a,b and associated switch act as a safety device. If an operator is present in the work area $A_1, A_2$ when the bi-fold door 510a,b closes, as the paddle bar 560a,b sweeps through the work area $A_1, A_2$, it will contact the operator. This contact will prevent the bi-fold door 510a,b from closing and thus prevent the mating device from engaging the switch.

The paddle bar 560a,b may be constructed of plastic and have a large surface area to distribute force if it contacts an operator. The paddle bar 560a,b may also include padding. In one embodiment, the paddle bar 560a,b includes additional contact switches (not shown) and the door 510a,b is configured to stop or reverse direction if the additional switches of the paddle bar 560a,b contact an operator in the work area $A_1, A_2$.

In one embodiment, each paddle bar 560a,b is located about 30 centimeters above the ground. However, it should be understood that the paddle bar 560a,b may be placed at any distance above the ground.

FIG. 7 illustrates a perspective view of a fume hood 700 for a work cell. FIG. 8 illustrates a top view of the fume hood 700. The fume hood 700 includes a plurality of walls W and a ceiling C with a first duct $D_1$ and a second duct $D_2$. In the illustrated embodiment, the walls W and the ceiling C are angled to direct fume toward the first and second ducts $D_1, D_2$. However, it should be understood that the geometry of the walls and ceiling may be varied as desired.

The fume hood 700 may be particularly suited for a work cell having two work areas, and may be configured such that each of the first and second ducts $D_1, D_2$ is located above a work area. However, it should be understood that the presence and location of ducts may be varied. For example, a fume hood may include a duct for each work area being covered. Alternatively, a fume hood may include a single duct, regardless of the number of work areas being covered. Further, it should be understood that the ducts may be located on a wall, instead of the ceiling.

In the illustrated embodiment, the fume hood 700 includes a first hinged door 710a and a second hinged door 710b disposed in the ceiling C. Each of the first and second doors 710a,b is operatively connected to one of a first and second linear actuator 720a,b. The first and second linear actuators 720a,b may be pneumatic cylinders, gas springs, hydraulic cylinders, ball-screw actuators, or any other known linear actuators.

With continued reference to FIGS. 7 and 8, each of the first and second linear actuators 720a,b is pivotally connected to one of a first and second mount 730a,b. Additionally, each of the first and second linear actuators 720a,b includes a rod 740a,b pivotally connected to a pivot member 750a,b on the hinged door 710a,b. When the rod 740a,b extends outward, the door 710a,b hingedly closes as the rod 740a,b pivots with respect to the pivot member 750a,b. Additionally, when the rod 740a,b contracts inward, the door 710a,b hingedly opens as the rod 740a,b pivots with respect to the pivot member 750a,b. In an alternative embodiment (not shown), the rod 740a,b may translate along the door 710a,b as the door hingedly closes.

In one embodiment, the hinged doors 710a,b are positioned above work areas, such that one or more cranes may be employed to lower work pieces into a work area and to remove completed projects from the work area. In one embodiment, one hinged door is employed above each work area. In an alternative embodiment (not shown), a pair of hinged doors are employed to cover a single aperture.

Figure 9:
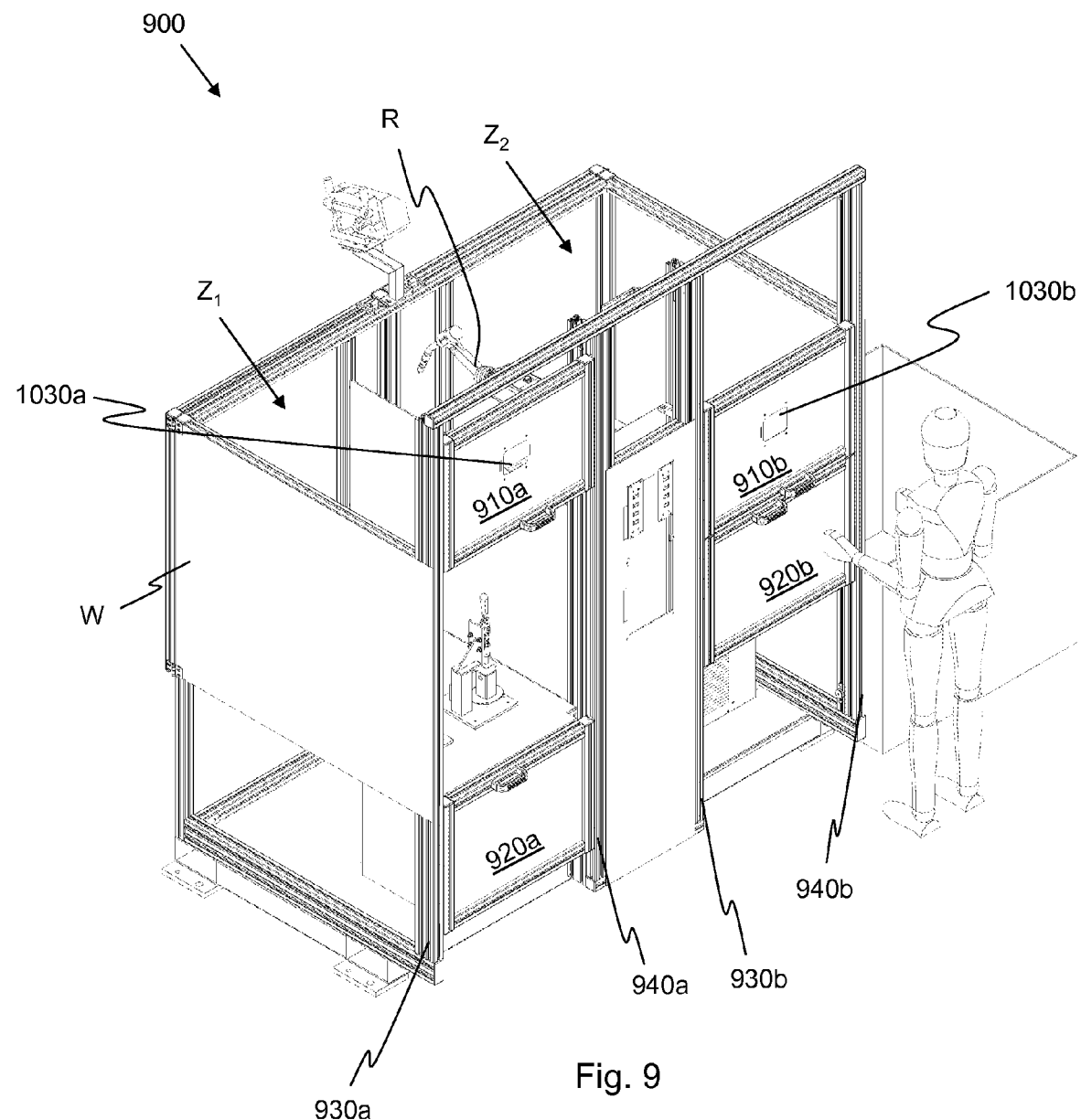
FIG. 9 is a front perspective view of one embodiment of a work cell 900 having sliding doors.
Figure 10:
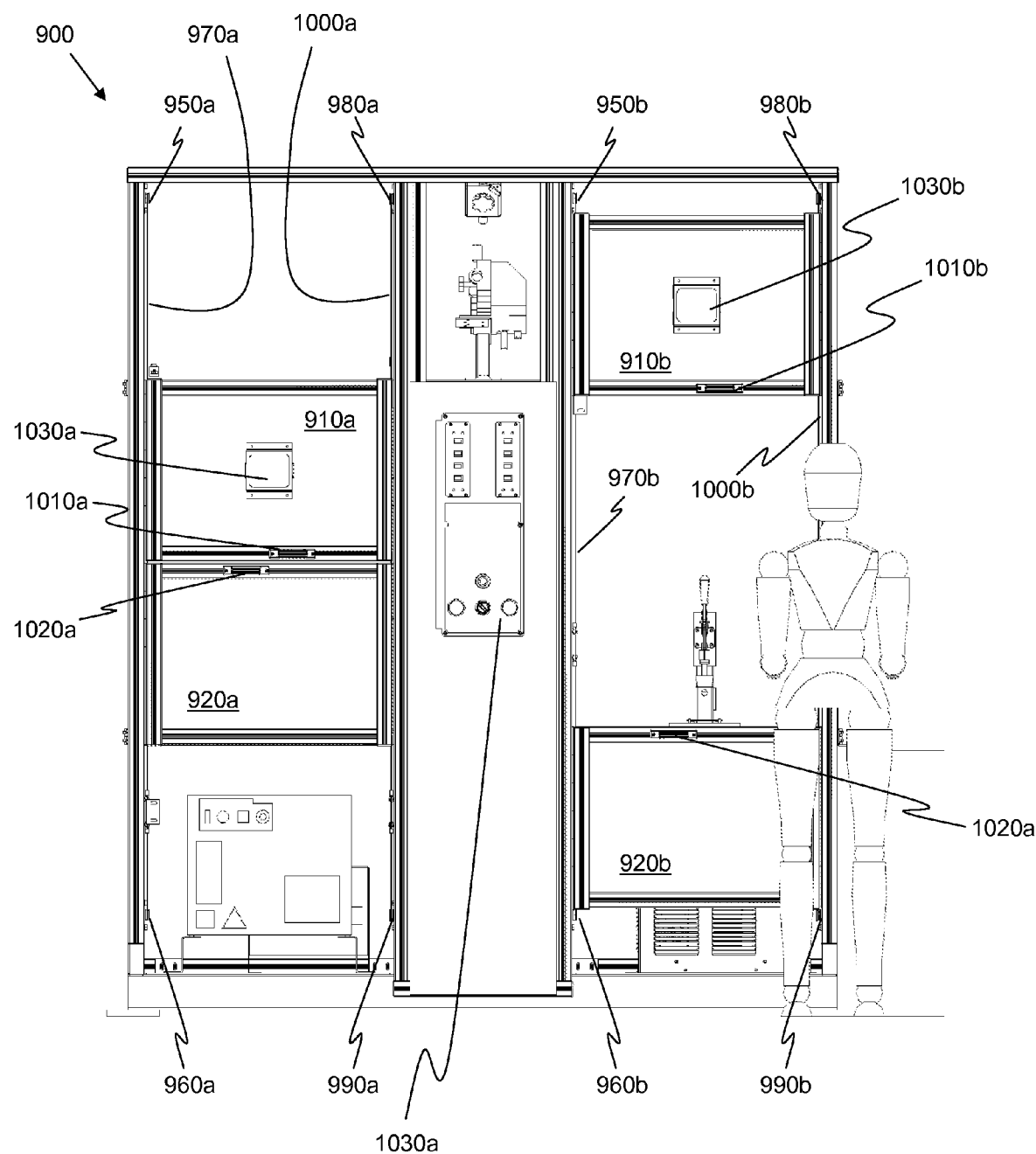
FIG. 10 is a front view of the work cell 900.
Figure 11:
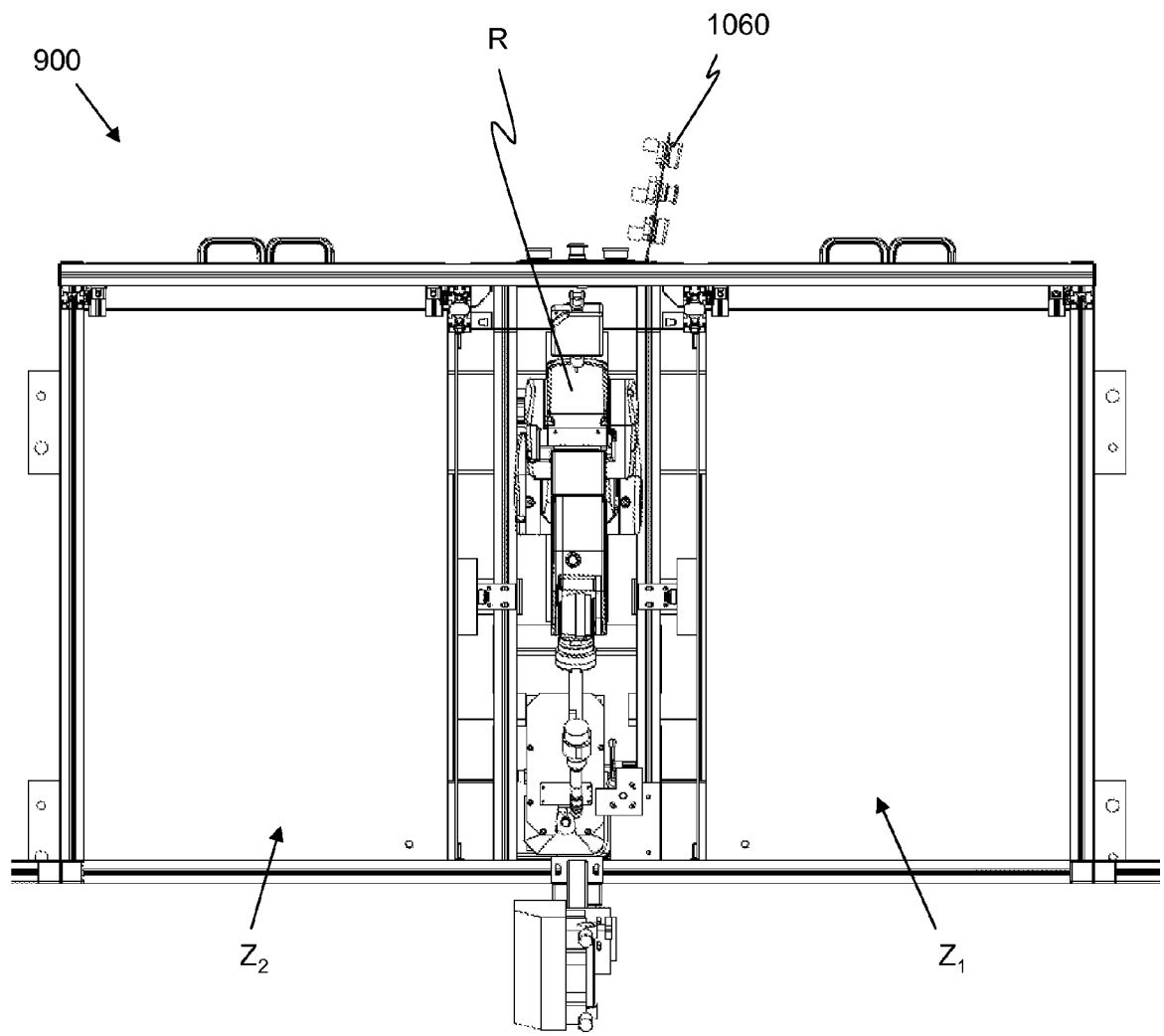
FIG. 11 is a top view of the work cell 900.
Figure 12A:
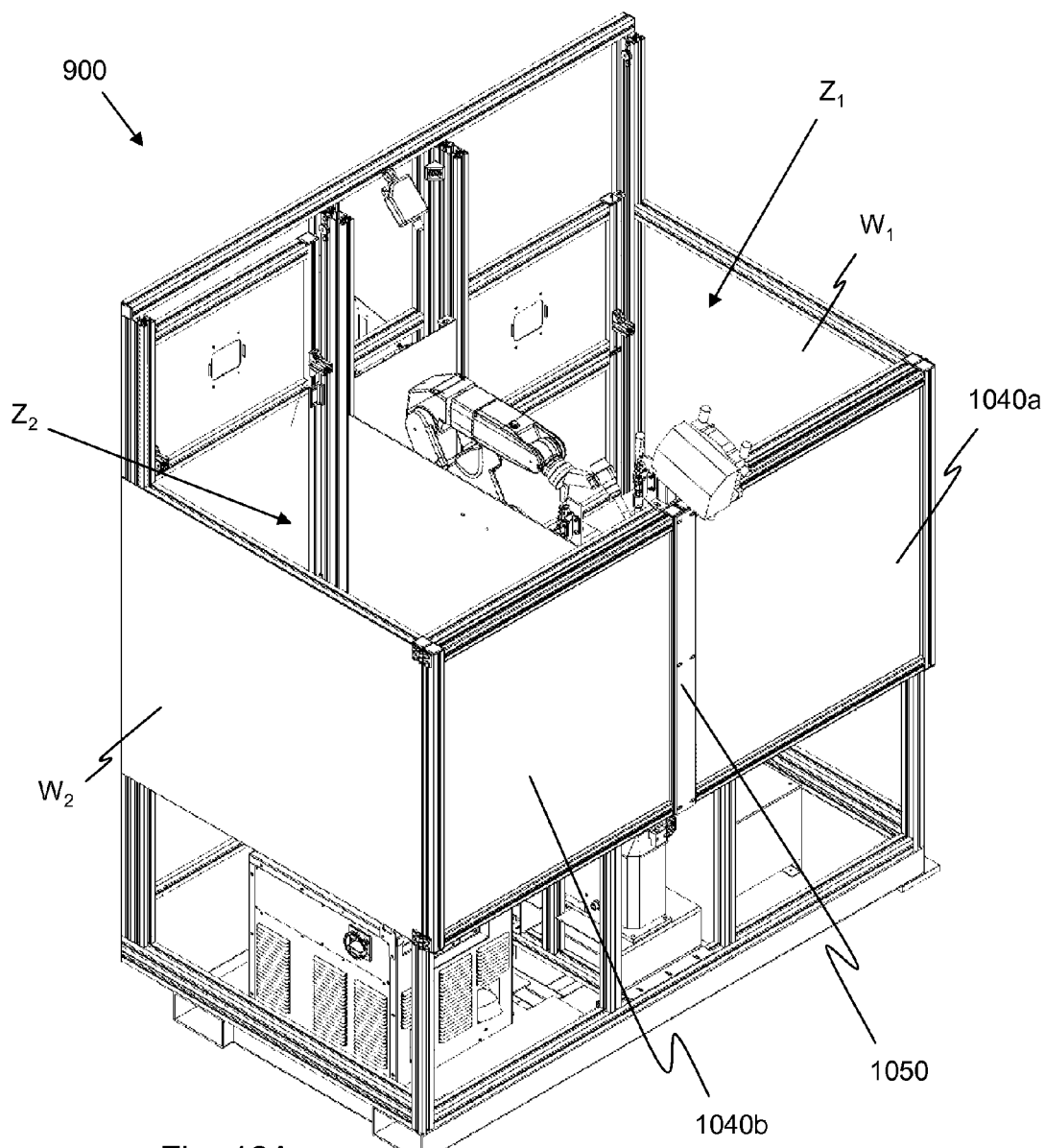
FIG. 12A is a rear perspective view of the work cell 900 with rear access doors in a closed position.
Figure 12B:
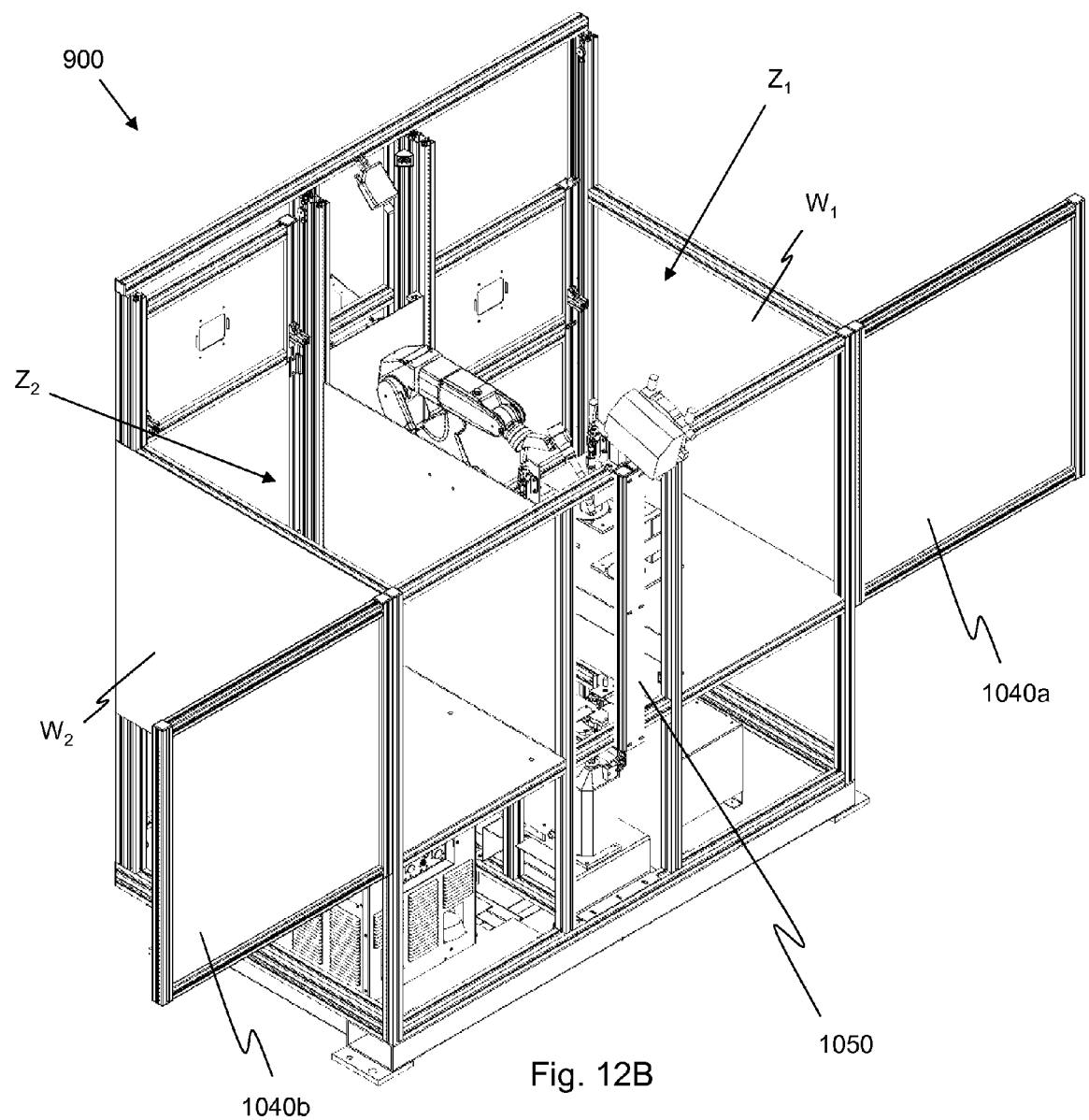
FIG. 12B is a rear perspective view of the work cell 900 with rear access doors in a closed position.
Figure 13:
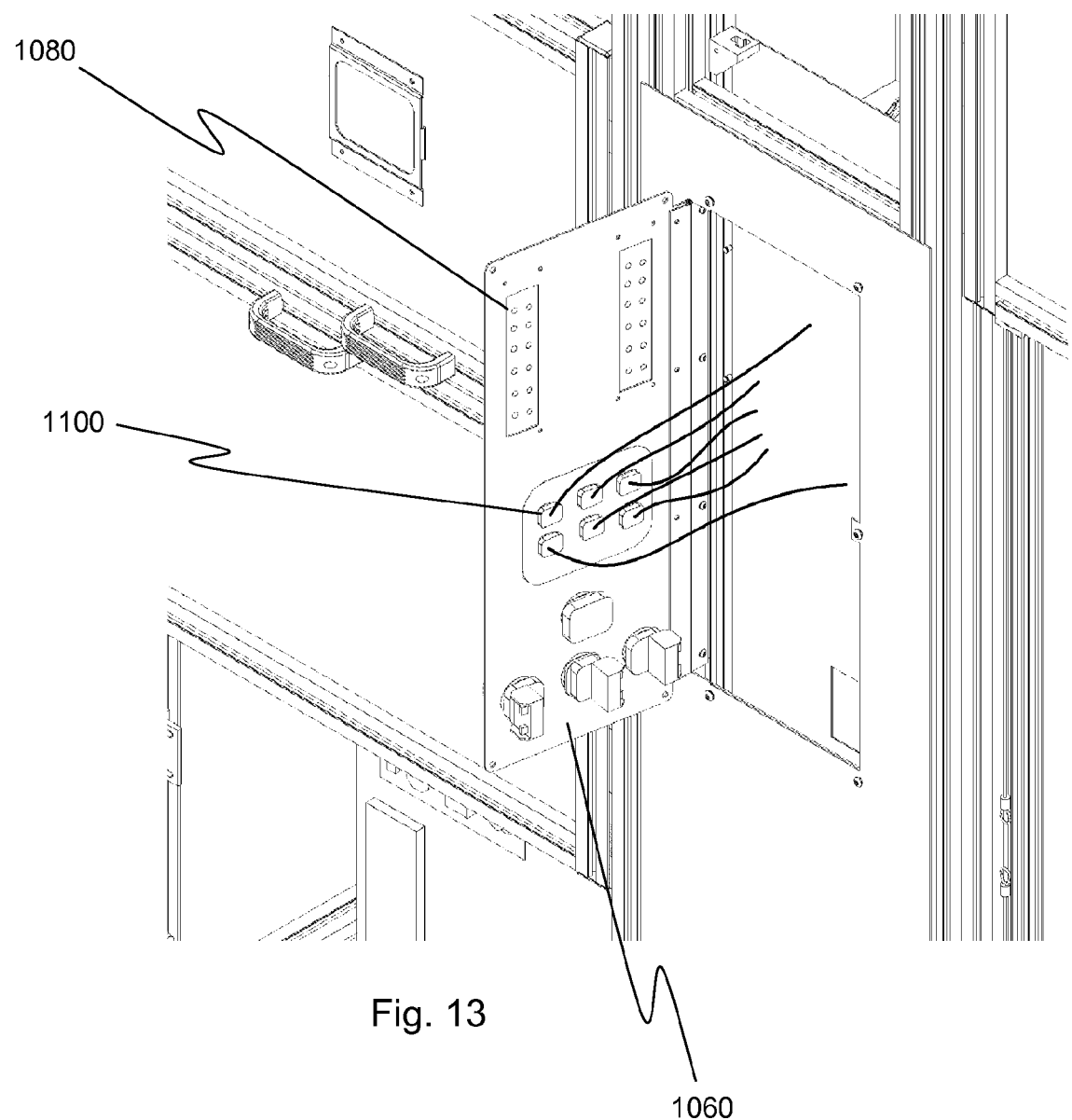
FIG. 13 is a close up, partial perspective view of an access panel on the work cell 900.

FIGS. 9-13 illustrate an alternative embodiment of a work cell 900 with a plurality of walls W. FIG. 9 illustrates a front perspective view of the work cell 900. FIG. 10 illustrates a front plan view of the work cell 900. FIG. 11 illustrates a top plan view of the work cell 900. FIGS. 12A and 12B illustrate rear perspective views of the work cell 900. FIG. 13 illustrates a close up perspective view of the work cell 900.

In the illustrated embodiment, the walls W of the work cell 900 define two work zones, including a first work zone $Z_1$ and a second work zone $Z_2$. It should be understood, however, that a work cell may include any number of walls and any number of work zones.

In the illustrated embodiment, the work cell 900 is an automated welding station that may also be referred to as a work station. In one embodiment, welding is performed in the first and second work zones $Z_1, Z_2$ by a robot R located between the two work zones. However, it should be understood that any operation may be performed in the work cell 900.

The walls W forming the first and second work zones $Z_1, Z_2$ may shield the eyes of the operator from an arc created by a welding torch. It should be understood, however, that the work cell 900 is not limited to use in a welding environment. The work cell 900 may be employed for any manufacturing or work environment.

In the illustrated embodiment, the work cell 900 has an open top. In alternative embodiments (not shown), one or more of the work areas may include a ceiling or a fume hood.

With reference to FIGS. 9 and 10, the work cell 900 includes a first pair of vertically sliding doors, including a first upper sliding door 910a and a first lower sliding door 920a, that provide access to the first work $Z_1$. The first pair of vertically sliding doors may also be referred to as a first compound door. The first upper sliding door 910a and the first lower sliding door 920a are disposed between a first left track 930a and a first right track 940a. The first upper and lower sliding doors 910a, 920a slidably engage the first left and right tracks 930a, 940a with rollers, rails, or any other known engagement means.

As can be best seen in FIG. 10, the first left track 930a is operatively connected to a first upper left pulley 950a and a first lower left pulley 960a. A first left cable 970a forms an endless loop around the first upper left pulley 950a and the first lower left pulley 960a, and is fixedly connected to both the first upper sliding door 910a and the first lower sliding door 920a. Similarly, the first right track 940a is operatively connected to a first upper right pulley 980a and a first lower right pulley 990a. A first right cable 1000a forms an endless loop around the first upper right pulley 980a and the first lower right pulley 990a, and is fixedly connected to both the first upper sliding door 910a and the first lower sliding door 920a. In an alternative embodiment (not shown), a single pulley and cable system is employed.

When the first upper door 910a and first lower door 910b are connected by cables and pulleys in the manner shown, an upward force or downward force will cause the doors to move in opposing directions. For example, if an upward force is applied on the first upper door 910a, the first upper door 910a will move upward and the first lower door 910b will move downward.

In one embodiment, the first upper door 910a weighs the same as the first lower door 920b. In such an embodiment, the first upper door 910a and first lower door 920a counterbalance each other, such that the doors are in equilibrium at all positions. Further, only a small amount of force is required to move the doors.

In the illustrated embodiment, the first upper door 910a includes a first upper handle 1010a and the first lower door 920a includes a first lower handle 1020a. In the illustrated embodiment, the first upper handle 1010a is offset from the first lower handle 1020b. In an alternative embodiment (not shown), the first upper handle 910a is aligned with the first lower handle 920b.

Additionally the first upper sliding door 910a includes a window 1030a. In one embodiment, the window is transparent to allow observers to see inside the first work zone $Z_1$. In an alternative embodiment, the window is darkened, to allow observers to safely observe a welding operation. In another alternative embodiment, the window is auto-darkening to allow observers to see inside the first work zone $Z_1$ when no welding is occurring, and also safely observe a welding operation when an arc is present. In yet another alternative embodiment (not shown), the first lower sliding door 920a may include a window instead of, or in addition to, the window 1030a of the first upper sliding door.

In the illustrated embodiment, the work cell 900 further includes a second upper sliding door 910b and a second lower sliding door 920b that provides access to the second work $Z_2$. The second pair of vertically sliding doors may also be referred to as a second compound door. The second upper sliding door 910b and the second lower sliding door 920b are disposed between a second left track 930b and a second right track 940b. The second upper and lower sliding doors 910b, 920b slidably engage the second left and right tracks 930b, 940b with rollers, rails, or any other known engagement means.

As can be best seen in FIG. 10, the second left track 930b is operatively connected to a second upper left pulley 950b and a second lower left pulley 960b. A second left cable 970b forms an endless loop around the second upper left pulley 950b and the second lower left pulley 960b, and is fixedly connected to both the second upper sliding door 910b and the second lower sliding door 920b. Similarly, the second right track 940b is operatively connected to a second upper right pulley 980b and a second lower right pulley 990b. A second right cable 1000b forms an endless loop around the second upper right pulley 980b and the second lower right pulley 990b, and is fixedly connected to both the second upper sliding door 910b and the second lower sliding door 920b. In an alternative embodiment (not shown), a single pulley and cable system is employed.

When the second upper door 910b and second lower door 910b are connected by cables and pulleys in the manner shown, an upward force or downward force will cause the doors to move in opposing directions. For example, if an upward force is applied on the second upper door 910b, the second upper door 910b will move upward and the second lower door 910b will move downward.

In one embodiment, the second upper door 910b weighs the same as the second lower door 920b. In such an embodiment, the second upper door 910b and second lower door 920b counterbalance each other, such that the doors are in equilibrium in any position. Further, only a small amount of force is required to move the doors.

In the illustrated embodiment, the second upper door 910b includes a second upper handle 1010b and the second lower door 920b includes a second lower handle 1020b. In the illustrated embodiment, the second upper handle 1010b is offset from the second lower handle 1020b. In an alternative embodiment (not shown), the second upper handle 1010b is aligned with the second lower handle 1020b.

Additionally the second upper sliding door 910b includes a window 1030b. In one embodiment, the window is transparent to allow observers to see inside the second work zone $Z_2$. In an alternative embodiment, the window is darkened, to allow observers to safely observe a welding operation. In another alternative embodiment, the window is auto-darkening to allow observers to see inside the second work zone $Z_2$ when no welding is occurring, and also safely observe a welding operation when an arc is present. In yet another alternative embodiment (not shown), the second lower sliding door 920b may include a window instead of, or in addition to, the window 1030b of the second upper sliding door.

While two pairs of sliding doors are shown in the illustrated embodiment, it should be understood that a single pair of sliding doors may be employed. Alternatively, three or more pairs of sliding doors may be employed.

In the illustrated embodiment, the first upper and lower sliding doors 910a, 920a and second upper and lower sliding doors 910b, 920b are dimensioned to allow an operator to insert a hand or arm into the first and second work zones $Z_1, Z_2$. In alternative embodiments (not shown), the upper and lower sliding doors may be dimensioned to allow an operator to enter the first and second work zones $Z_1, Z_2$, respectively.

As best seen in FIGS. 12A and 12B, the work cell 900 includes first and second rear access doors 1040a,b that extend across the entire work cell 900. In the illustrated embodiment, the first rear access door 1040a is hingedly connected to a first wall $W_1$ of the work cell 900 and the second rear access door 1040b is hingedly connected to a second wall $W_2$ of the work cell 900. When the first and second rear access doors 1040a,b are in the open position, as shown in FIG. 12B, both the first and second work zones $Z_1, Z_2$ and the robot R are accessible to an operator for maintenance or to insert or remove items.

When the first and second rear access doors 1040a,b are in a closed position, as shown in FIG. 12A, each is adjacent a retaining member 1050 disposed on the work cell 900. In one embodiment, each of the first and second rear access doors 1040a,b is directly fastened to the retaining member 1050 by one or more fasteners. In an alternative embodiment, one of the first and second rear access doors 1040a,b overlaps and captures the other of the first and second rear access doors 1040a,b, and one or more fasteners pass through both the first and second rear access doors 1040a,b and fasten them to the retaining member 1050. Exemplary fasteners include, without limitation, bolts, screws, clamps, clasps, pegs, pins, tacks, and ties.

With reference now to FIGS. 10 and 13, the work cell 900 also includes an access panel 1060 on a front wall of the work cell 900. In the illustrated embodiment, one side of the access panel 1060 is hingedly connected to the front wall of the work cell 900 and the access panel 1060 is held in a closed position by one or more fasteners 1070. Exemplary fasteners include, without limitation, bolts, screws, clamps, clasps, pegs, pins, tacks, and ties.

When the access panel 1060 is closed, as shown in FIG. 10, one or more indicators 1080, and one or more controls 1090 are provided on the exterior face of the access panel. Exemplary indicators include, without limitation, LEDs and LCDs. Exemplary controls include buttons, switches, or dials for starting or stopping an operation.

When the access panel 1060 is opened, as shown in FIG. 13, the indicators 1080 are also visible to the operator on the interior side of the access panel 1060. A printed circuit board assembly 1100 is also disposed on the interior side of the access panel 1060 and is electrically connected to the indicators 1080. The printed circuit board assembly includes a plurality of components and wires, with each component corresponding to one or more of the plurality of indicators 1080. Accordingly, an operator may connect, disconnect, or replace a component as needed according to the indicator. Maintenance instructions for connecting, disconnecting, or replacing a component may be provided on the access panel 1060 itself, or in a separate manual or database.

Figure 14:
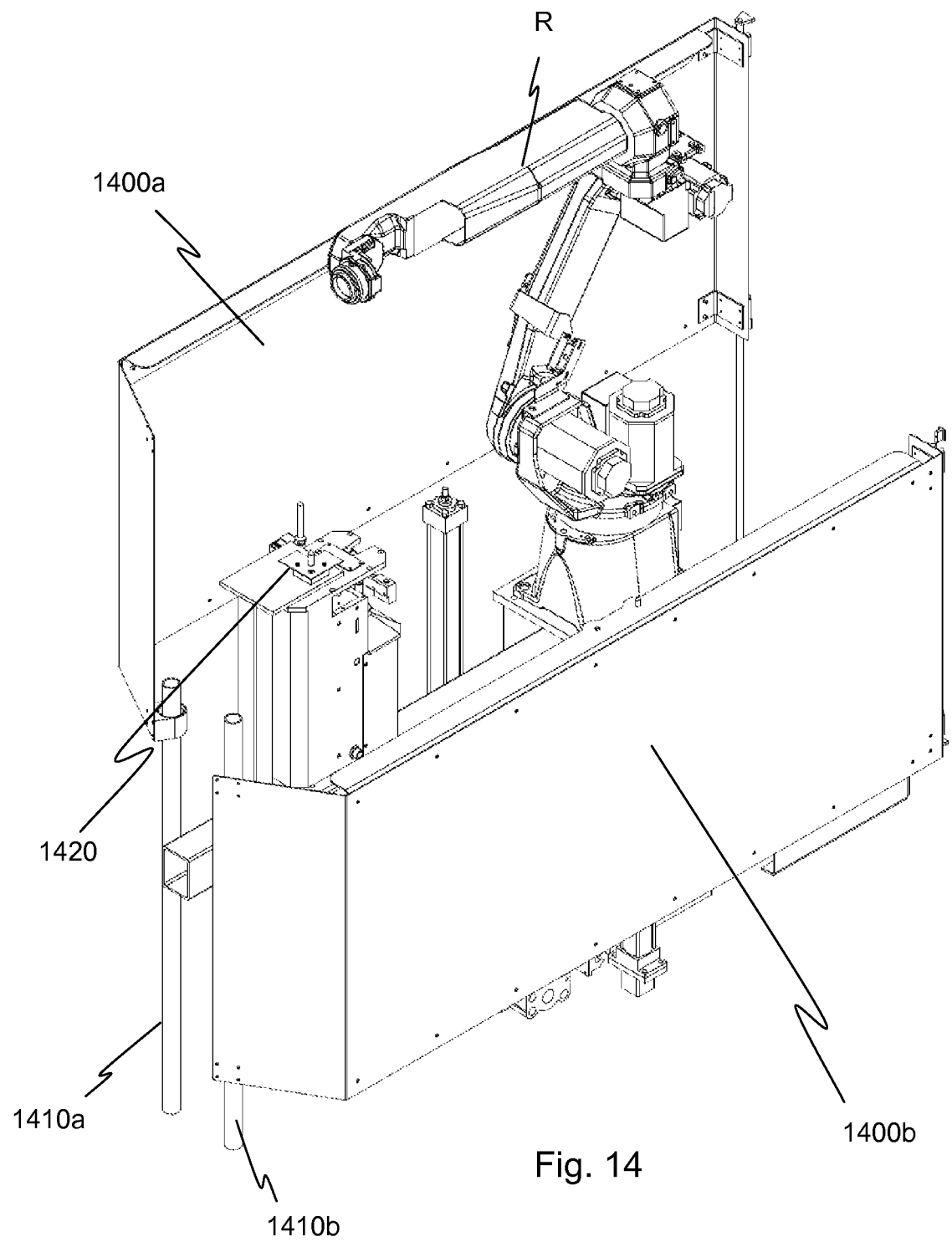
FIG. 14 is a perspective view of one embodiment of sliding shields for a work cell.
Figure 15:
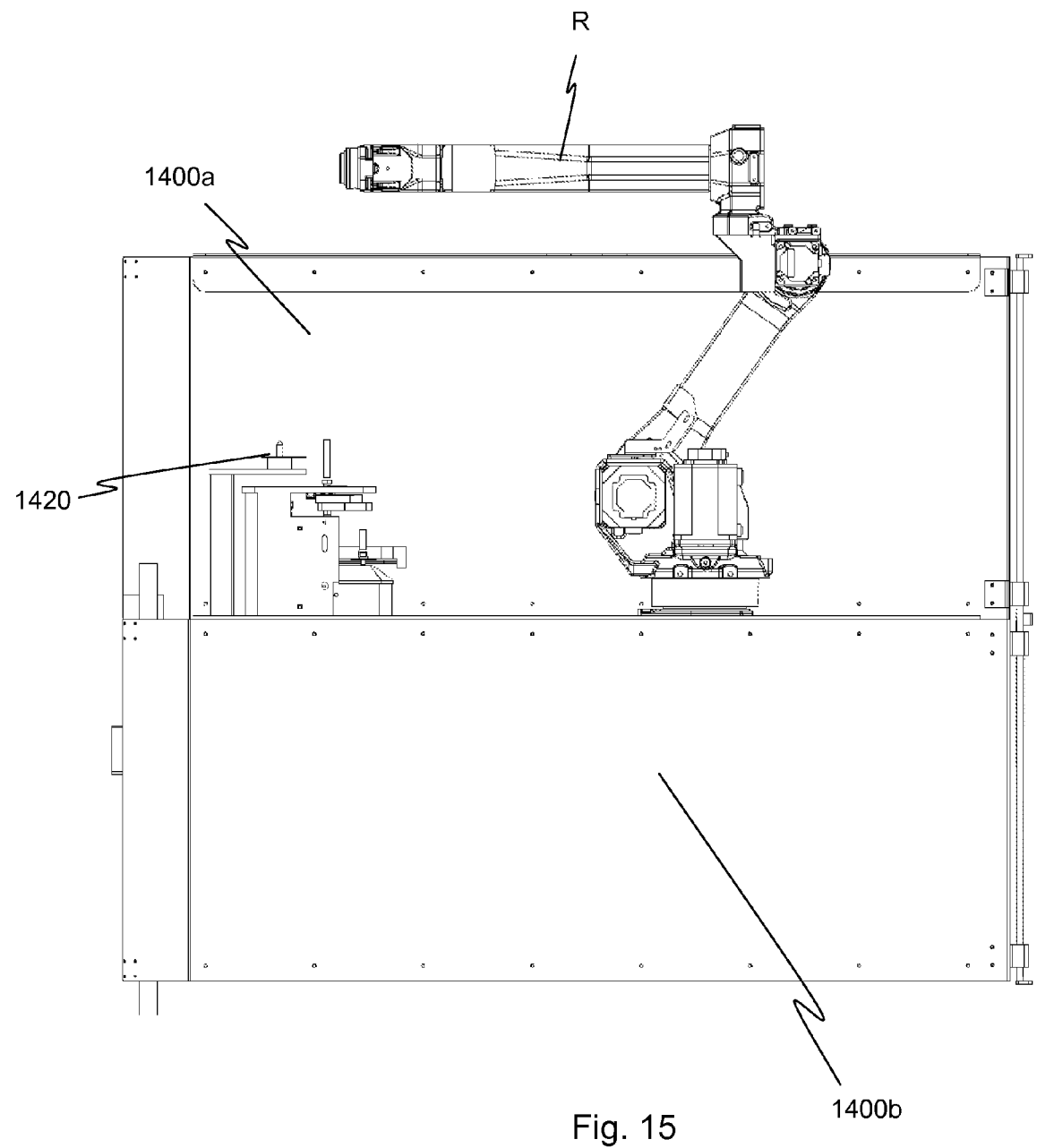
FIG. 15 is a side view of one embodiment of sliding shields for a work cell.

FIGS. 14 and 15 illustrate a perspective view and a side view, respectively of a robot R and a pair of movable shields 1400a,b that may be employed in a work cell, such as work cell 100, work cell 500, or work cell 900. In the illustrated embodiment, a first movable shield 1400a is slidably disposed on a first post 1410a on a first side of the robot R and a second movable shield 1400b is slidably disposed on a second post 1410b on a second side of the robot R. The first movable shield 1400a may be adjacent a first work zone or first work area (not shown), and the second movable shield may be adjacent a second work zone or second work area (not shown). The first and second posts 1410a,b may include pneumatic cylinders to move the first and second shields 1400a,b up and down. Alternatively, motors or other force producing mechanisms may be employed to move the first and second shields 1400a,b up and down.

In one known embodiment, the first shield 1400a is raised to an upward position when the second shield 1400b is lowered to a downward position. In this configuration, the robot R may weld or perform other operations in a second work area or second work zone adjacent the second shield 1400b while an operator accesses a first work area adjacent the first shield 1400a. Similarly, the second shield 1400b may be raised to an upward position when the first shield 1400a is lowered to a downward position. In this configuration, the robot R may weld or perform other operations in a first work area adjacent the first shield 1400a while an operator accesses a second work area or second work zone adjacent the second shield 1400b.

While a pair of shields 1400a,b are shown in the illustrated embodiment, it should be understood that a single shield may be employed with the robot R. Alternatively, three or more shields may be employed.

With continued reference to FIGS. 14 and 15, a reamer 1420 is disposed between the first shield 1400a and the second shield 1400b. The reamer 1420 is configured to rotate. The reamer 1420 may be fixed in a vertical position or it may be configured to translate up and down. The robot R engages the reamer 1420 for maintenance. For example, if the robot R is a welding robot having a welding torch (not shown), the robot R may move the nozzle of the welding torch into engagement with the reamer 1420. The reamer 1420 may translate up and down as it rotates to clean spurious material from the nozzle. Alternatively, the robot R may move the nozzle of the welding torch up and down as the reamer 1420 rotates in a fixed position. The robot R may be configured to engage the reamer 1420 after a predetermined length of time or after performing a predetermined number of operations. Alternatively, the robot R may be configured to engage the reamer 1420 in response to an operator command.

In one embodiment, both the first shield 1400a and the second shield 1400b are configured to raise to an upward position when the robot R engages the reamer 1420. In an alternative embodiment, both the first shield 1400a and the second shield 1400b are configured to lower to a downward position when the robot R engages the reamer 1420. In another alternative embodiment, one of the first and second shields 1400a,b may be raised while the other shield is lowered when the robot R engages the reamer 1420.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. An accessible work cell comprising:
   a plurality of walls defining at least one work zone;
   a welding robot configured to perform a welding operation within the at least one work zone; and
   at least one pair of sliding doors that provides access to the at least one work zone, the at least one pair of sliding doors including an upper sliding door and a lower sliding door, wherein the upper sliding door is operatively connected to the lower sliding door such that movement of the upper sliding door in a first direction will cause the lower sliding door to move in a second direction opposite to the first direction,
   wherein the at least one work zone includes at least a first work zone and a second work zone, and the accessible work cell further comprises a second pair of sliding doors, wherein the second pair of sliding doors provides access to the second work zone, and includes a second upper sliding door and a second lower sliding door, the second upper sliding door being operatively connected to the second lower sliding door such that movement of the second upper sliding door in a first direction will cause the second lower sliding door to move in a second direction opposite to the first direction,
   wherein the welding robot is disposed between the first work zone and the second work zone, and
   wherein the accessible work cell further comprises a first movable shield disposed on a first side of the welding robot between the welding robot and the first work zone, and a second movable shield disposed on a second side of the welding robot between the welding robot and the second work zone, the first moveable shield and the second moveable shield defining an area between the first work zone and the second work zone, the area separating the first work zone from the second work zone, and the welding robot being disposed in the area between the first movable shield and the second movable shield, wherein the first movable shield is slidably movable between upward and downward positions along a first vertical post and the second movable shield is slidably movable between upward and downward positions along a second vertical post, and the first movable shield is held in its upward position at the first vertical post and the second movable shield is held in its downward position at the second vertical post while the welding robot performs a welding operation in the second work zone, and the first movable shield is held in its downward position at the first vertical post and the second movable shield is held in its upward position at the second vertical post while the welding robot performs another welding operation in the first work zone, the accessible work cell further comprising
   a fume hood having a plurality of walls and an angled ceiling angled to direct fumes toward an exhaust duct of the fume hood, the fume hood further comprising at least one hinged door disposed in the angled ceiling, and at least one actuator for operating the at least one hinged door, the at least one hinged door providing vertical access from exterior of the fume hood and through the angled ceiling to at least one of the first work zone and the second work zone.

2. The accessible work cell of claim 1, further comprising an access panel disposed on one of the plurality of walls of the accessible work cell.

3. The accessible work cell of claim 2, wherein the access panel has a plurality of indicators and a plurality of controls disposed on an exterior side.

4. The accessible work cell of claim 3, wherein the access panel is hingedly connected to the one of the plurality of walls of the accessible work cell, and wherein a printed circuit board assembly is disposed on an interior side of the access panel and is electrically connected to the plurality of indicators.

5. The accessible work cell of claim 1, wherein each of the first pair of sliding doors and the second pair of sliding doors are disposed on a first side of the accessible work cell.

6. The accessible work cell of claim 5, further comprising a pair of hinged doors on a second side of the accessible work cell opposite the first side, wherein the pair of hinged doors provide access to the first work zone and the second work zone.

7. The accessible work cell of claim 1, further comprising a reamer disposed between the first movable shield and the second movable shield, wherein the first movable shield is held in its upward position at the first vertical post and the second movable shield is held in its upward position at the first vertical post while the welding robot engages the reamer.

8. A robotic welding cell comprising:
   a plurality of walls defining at least two work areas, including a first work area and a second work area;
   a robot disposed between the first work area and the second work area;
   a first movable shield disposed between the robot and the first work area;
   a second movable shield disposed between the robot and the second work area; the first moveable shield and the second moveable shield defining a zone between the first work area and the second work area, the zone separating the first work area from the second work area, wherein the robot is disposed is the zone between the first movable shield and the second movable shield; and
   at least two doors, including a first compound door and a second compound door, disposed on a first side of the robotic welding cell, wherein the first compound door provides access to the first work area and the second compound door provides access to the second work area, wherein the first movable shield and the second movable shield are slidably movable between respective upward and downward positions along respective first and second vertical posts, and the first movable shield is held in its upward position at the first vertical post and the second movable shield is held in its downward position at the second vertical post while the robot performs a welding operation in the second work area, and the first movable shield is held in its downward position at the first vertical post and the second movable shield is held in its upward position at the second vertical post while the robot performs another welding operation in the first work area, the robotic welding cell further comprising a fume hood having a plurality of walls and an angled ceiling angled to direct fumes from a lower portion of the angled ceiling toward an upper portion of the angled ceiling and further toward an exhaust duct of the fume hood, the fume hood further comprising at least one hinged door disposed in the angled ceiling, the at least one hinged door comprising a hinge extending along an edge thereof between the lower portion of the angled ceiling and the upper portion of the angled ceiling, the fume hood further comprising at least one actuator for operating the at least one hinged door to rotate about the hinge, the at least one hinged door providing vertical access from exterior of the fume hood and through the angled ceiling to at least one of the first work area and the second work area.

9. The robotic welding cell of claim 8, wherein the first compound door is a first bi-fold door and the second compound door is a second bi-fold door.

10. The robotic welding cell of claim 9, further comprising:
a first paddle bar operatively connected to a first bottom portion of the first bi-fold door and configured to sweep the first work area when the first bi-fold door moves between an opened position and a closed position; and
a second paddle bar operatively connected to a second bottom portion of the second bi-fold door and configured to sweep the second work area when the second bi-fold door moves between an opened position and a closed position.

11. The robotic welding cell of claim 8, wherein the first compound door includes a first upper sliding door and first lower sliding door and the second compound door includes a second upper sliding door and a second lower sliding door.

12. An accessible work cell comprising:
a plurality of walls defining at least one work zone;
a welding robot configured to perform a welding operation within the at least one work zone;
a pair of vertically sliding doors disposed on a first side of the accessible work cell, the pair of vertically sliding doors including an upper sliding door and a lower sliding door;
means for connecting the upper sliding door to the lower sliding door, such that application of force to the upper sliding door in a first vertical direction will cause the lower sliding door to move in a second vertical direction opposite the first vertical direction;
means for accessing the at least one work zone from a second side of the accessible work cell, opposite the first side;
a fume hood having a plurality of walls and an angled ceiling angled to direct fumes toward an exhaust duct of the fume hood, the fume hood further comprising an aperture in the angled ceiling, the aperture covered by at least one hinged door disposed in the angled ceiling, and at least one actuator for operating the at least one hinged door, the at least one hinged door providing vertical access from exterior of the fume hood and through the aperture in the angled ceiling to the at least one work zone; and
wherein the at least one work zone comprises a first work zone and a second work zone, the accessible work cell further comprising:
a first movable shield disposed between the welding robot and the first work zone; a second movable shield disposed between the welding robot and the second work zone; wherein the first movable shield and the second movable shield are slidably movable between respective upward and downward positions along respective first and second vertical posts, and the first movable shield is held in its upward position along the first vertical post and the second movable shield is held in its downward position along the second vertical post while the welding robot performs a welding operation in the second work zone, and the first movable shield is held in its downward position along the first vertical post and the second movable shield is held in its upward position along the second vertical post while the welding robot performs another welding operation in the first work zone.

13. The accessible work cell of claim 12, further comprising:
a second pair of vertically sliding doors disposed on the first side of the accessible work cell, the second pair of vertically sliding doors including a second upper sliding door and a second lower sliding door; and
means for connecting the second upper sliding door to the second lower sliding door, such that application of force to the second upper sliding door in a first vertical direction will cause the second lower sliding door to move in a second vertical direction opposite the first vertical direction.

14. The accessible work cell of claim 12, wherein the welding robot includes a welding torch with a welding nozzle, and the accessible work cell further includes means for cleaning the welding nozzle.

* * * * *